Jan. 31, 1956    J. C. CRIVELLA    2,733,095
CONVERTIBLE HORSE TRAILERS
Filed Feb. 9, 1951    9 Sheets-Sheet 2

Fig. 2.

Inventor
Joseph C. Crivella
Attorney

Jan. 31, 1956 J. C. CRIVELLA 2,733,095
CONVERTIBLE HORSE TRAILERS
Filed Feb. 9, 1951 9 Sheets-Sheet 3

Inventor
Joseph C. Crivella
Attorney

Jan. 31, 1956  J. C. CRIVELLA  2,733,095
CONVERTIBLE HORSE TRAILERS
Filed Feb. 9, 1951  9 Sheets-Sheet 4
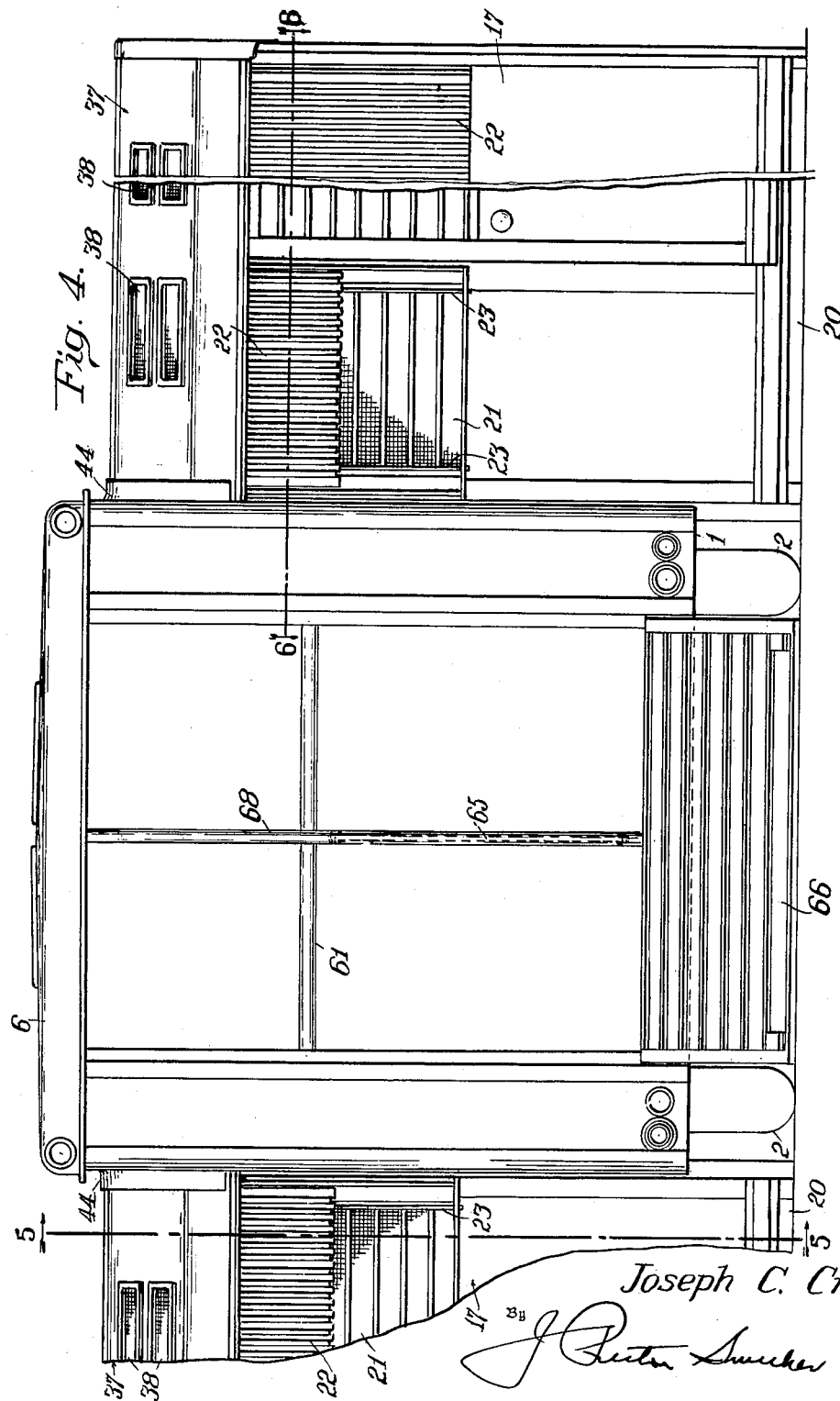

Jan. 31, 1956    J. C. CRIVELLA    2,733,095
CONVERTIBLE HORSE TRAILERS
Filed Feb. 9, 1951    9 Sheets-Sheet 5
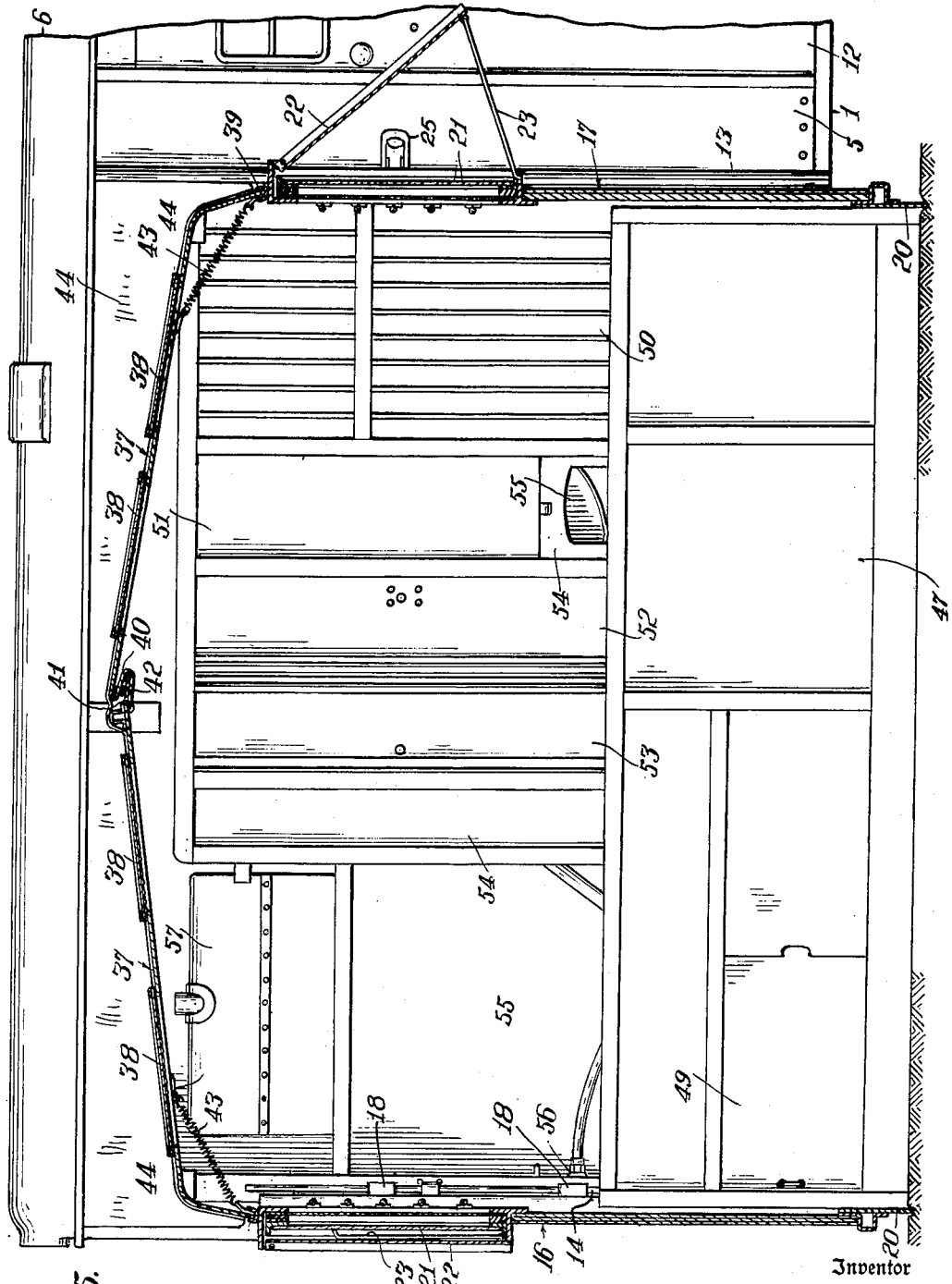
Fig. 5.
Inventor
Joseph C. Crivella
Attorney

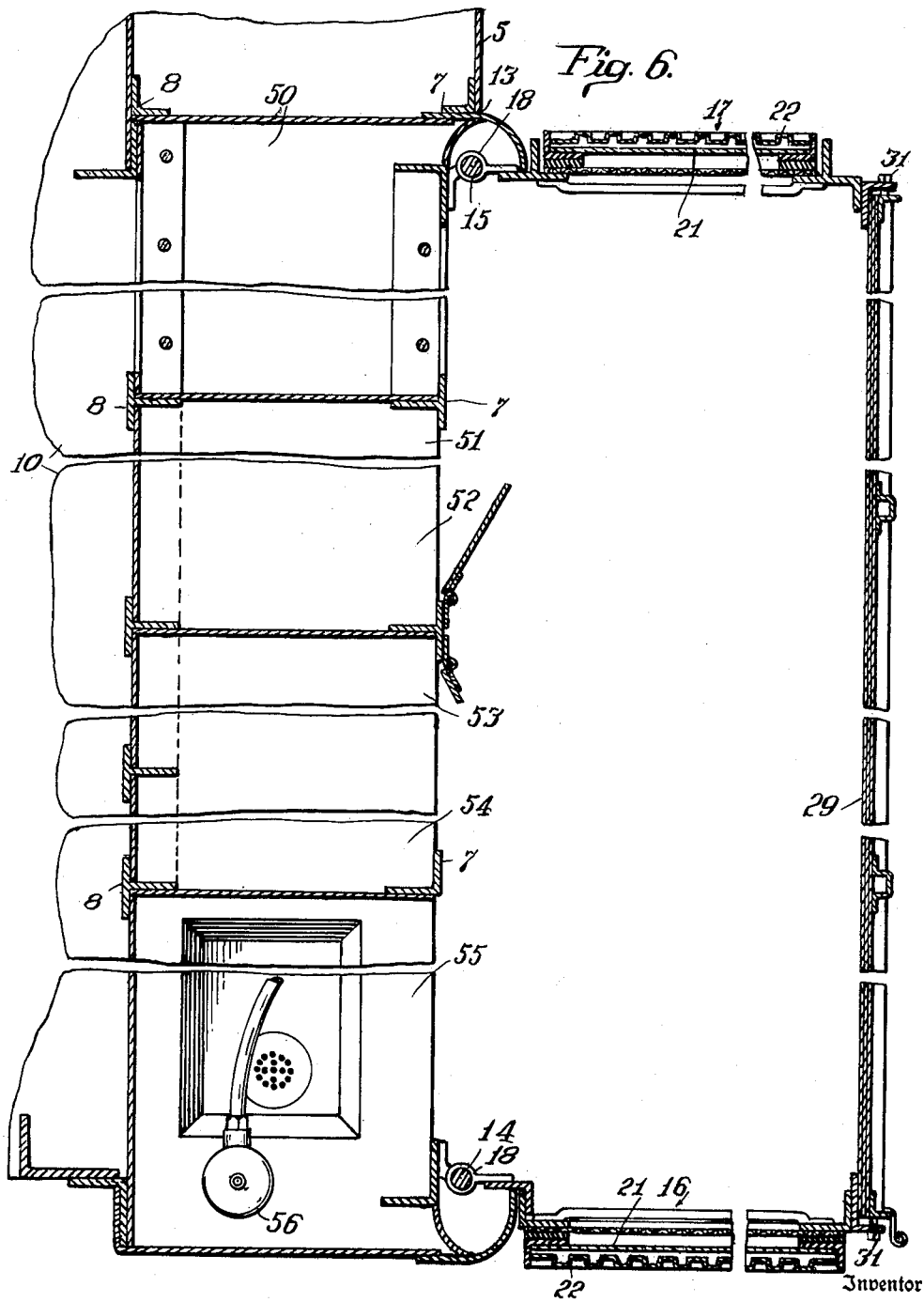

Jan. 31, 1956  J. C. CRIVELLA  2,733,095
CONVERTIBLE HORSE TRAILERS
Filed Feb. 9, 1951  9 Sheets-Sheet 7
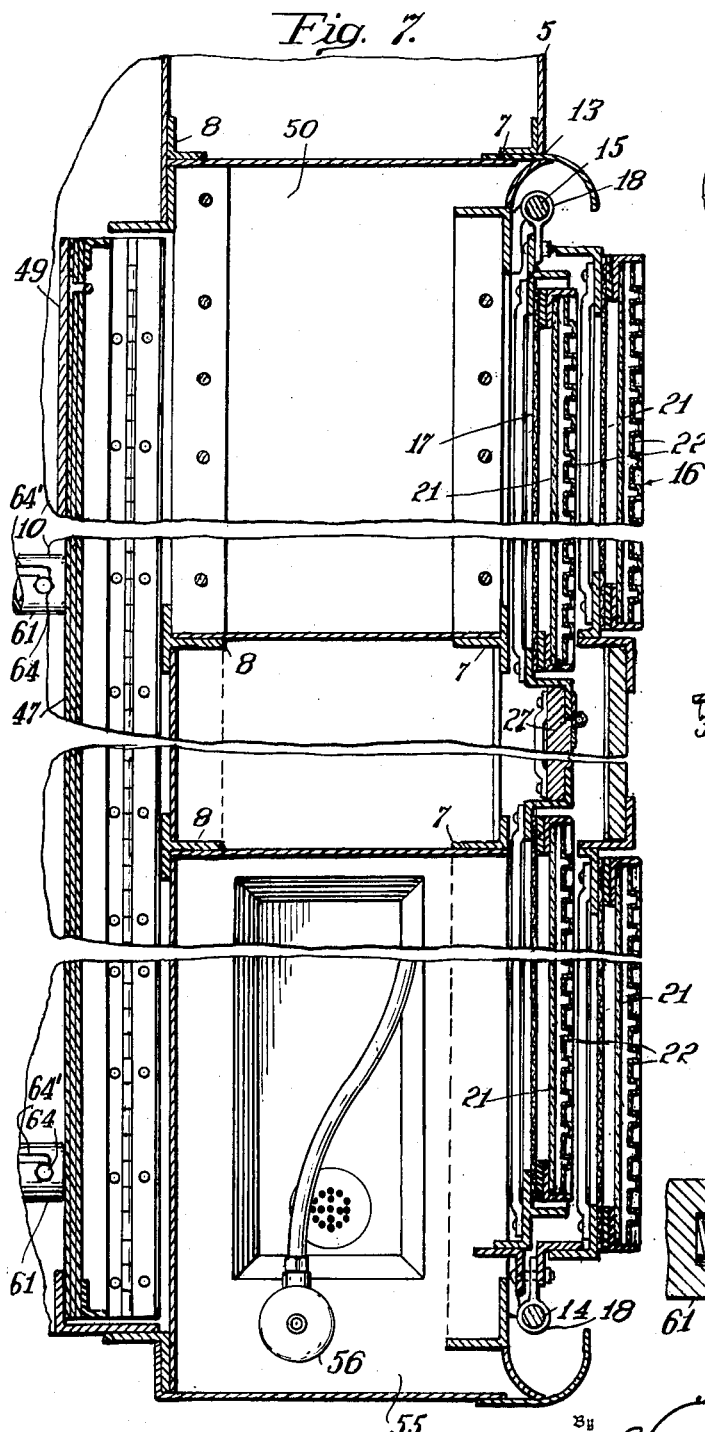
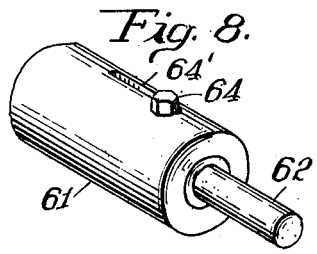
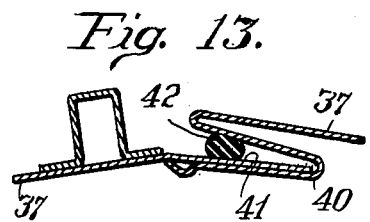
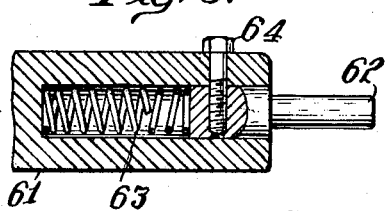
Inventor
Joseph C. Crivella
By
Attorney

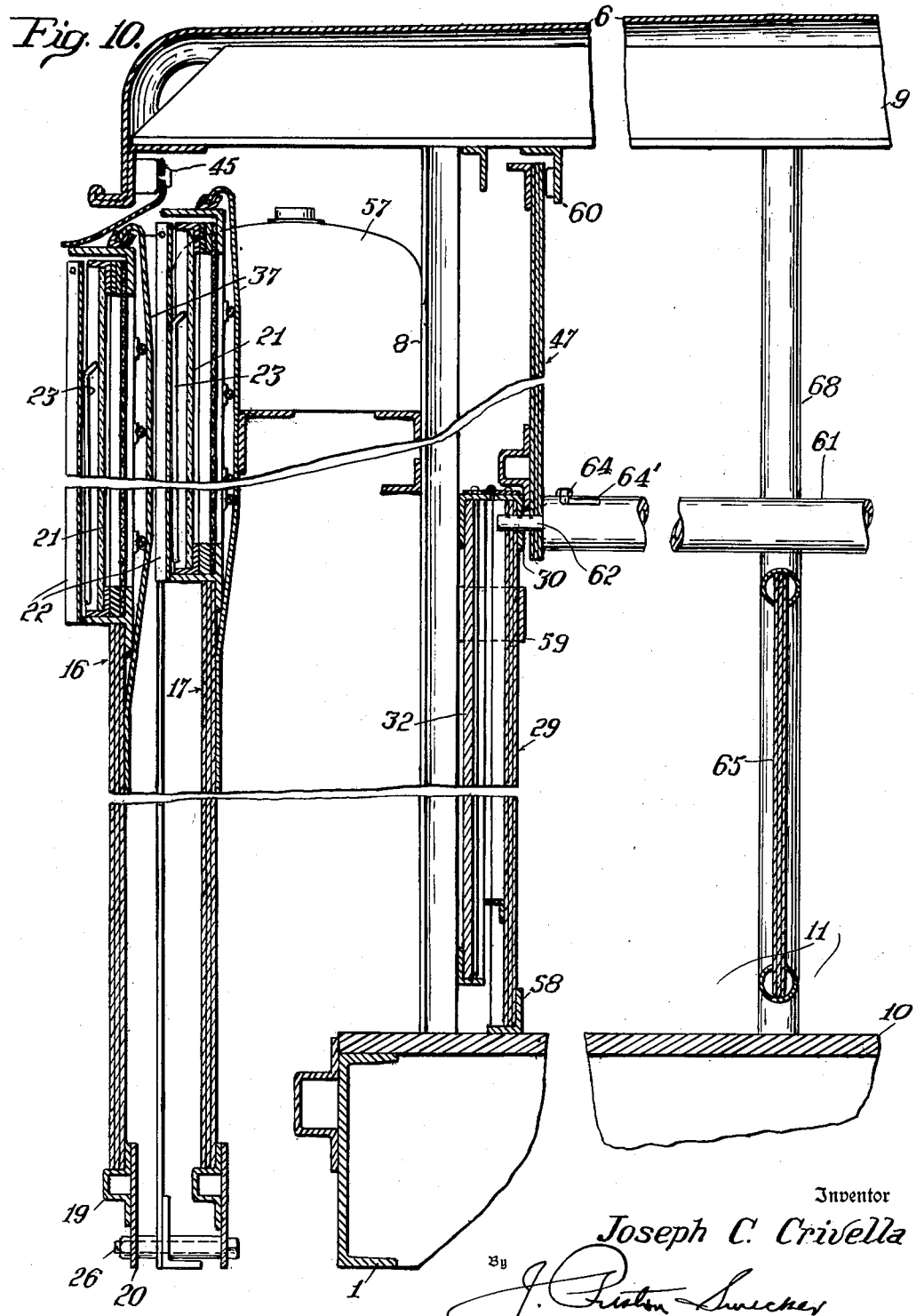

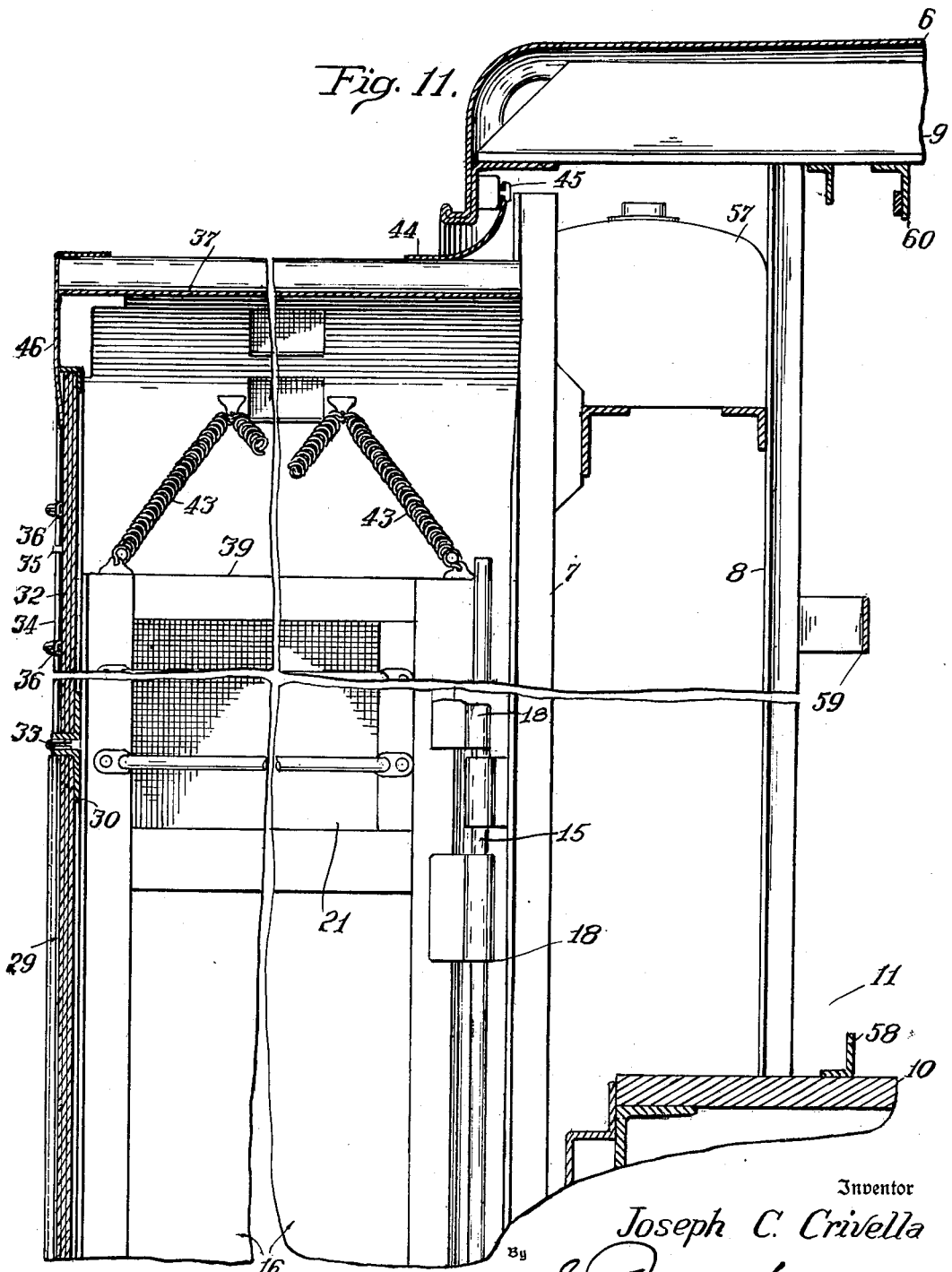

United States Patent Office 2,733,095
Patented Jan. 31, 1956

2,733,095

CONVERTIBLE HORSE TRAILERS

Joseph C. Crivella, Washington, D. C.

Application February 9, 1951, Serial No. 210,241

5 Claims. (Cl. 296—26)

This invention relates to improvements in vehicle trailers of the character adapted to be used as a trailer for transporting horses from place to place, as well as to provide accommodations for an attendant, although it may be used also as living quarters, for office and sales space, etc.

In the handling of racing and show horses, it is necessary to transport the animals to respective tracks or show rings, as has been customary heretofore. However, frequently not sufficient stalls are available for the housing of the horses, and this has made it necessary for a considerable amount of transportation of the horses back and forth, as well as confinement thereof in unsatisfactory quarters in many instances.

One object of this invention is to provide a van or trailer that may be used for transporting horses from place to place, whereby it may be converted to use as an enclosure or stall for confining one or more animals, without the necessity for housing the animals in stalls of barns at the track.

A further object of the invention is to improve the construction of vans or trailers adapted for transporting horses, to enable the van to be used not only for transportation, but also for conversion into stalls with adequate provision for watering and feeding the animals and for protecting them from the weather, which conversion may be made quickly and readily by an attendant when the van reaches the point of use.

Still another object of the invention is to improve the construction of trailers for general use to enable these to be used for transportation and then converted at the point of use to expand the usable capacity thereof, while providing compact weatherproof quarters.

These objects may be accomplished, according to one embodiment of the invention, by constructing the van or trailer with provision for expanding the capacity thereof into one or more compartments, for general use or for confining one or more horses therein according to the size of the van. It is preferred that provisions be made for hauling two horses in the van, with facilities for keeping them separated from each other and properly confined, but without serious difficulty or discomfort. Suitable provisions may be made for feeding and watering the animals while confined in the van, as well as in stalls to be set up beside the van and converted therefrom. Such a conversion may provide living or office space when the van is used for such purpose.

The van is constructed with sections capable of being separated and erected to form stalls or compartments on opposite sides thereof, which may be used for the confining therein of respectively different horses as well as for their care and feeding. The sides of the stalls are mounted on the sides of the van normally in folded relation and may be opened out for use, with means to close each of the respective stalls thus formed, as well as to cover the same. The parts of the stalls are light in weight and may be handled readily by a single attendant, who can erect the stalls in a very few minutes when needed. When enclosed in the stalls, the animals are effectively protected from the weather, but it is preferred that the roof of each stall be provided with transparent windows capable of transmitting therethrough the ultra-violet sunrays which may thereby find access to the animals to improve their health conditions.

This embodiment of the invention is illustrated in the accompanying drawings, in which:

Fig. 2 is a side elevation of the van showing one of the stalls;

Fig. 3 is a side elevation of the van with the parts folded for transportation;

Fig. 4 is a rear end elevation of the van showing the erected stalls in side elevation;

Fig. 5 is a vertical cross section through one of the erected stalls on the line 5—5 in Fig. 4;

Fig. 6 is a horizontal section therethrough on the line 6—6 in Fig. 4;

Fig. 7 is a similar view showing the panels in stored positions for transportation;

Fig. 8 is a detail perspective view of one of the guard rails;

Fig. 9 is a longitudinal section therethrough;

Fig. 10 is a vertical cross section through the van with the parts stored, taken on the line 10—10 in Fig. 3;

Fig. 11 is a vertical longitudinal section through one of the stalls, on the line 11—11 in Fig. 2;

Fig. 12 is a perspective view, partly in section, showing adjacent portions of the stall and trailer; and Fig. 13 is a detail cross section through the roof.

Figure 1:
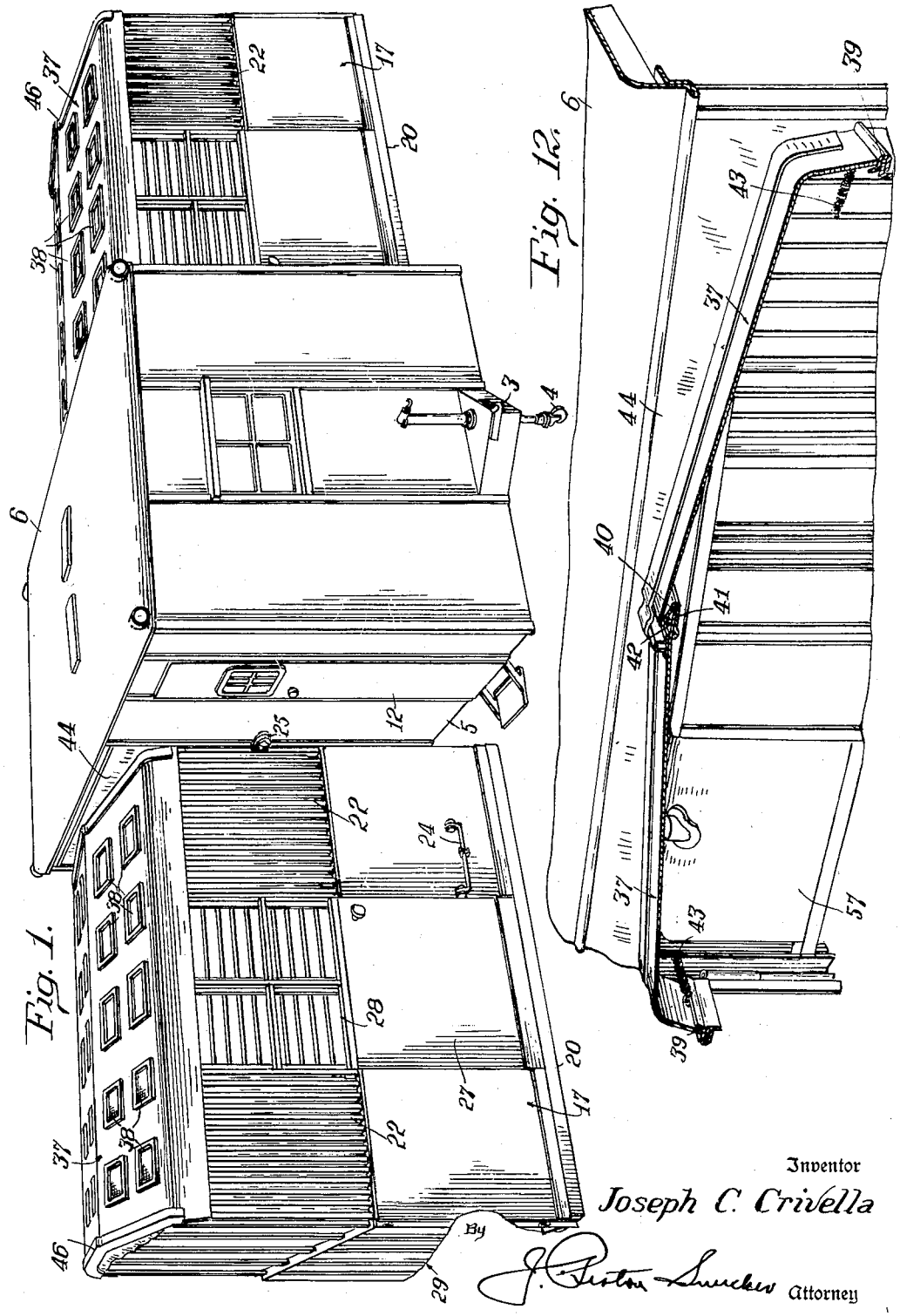
Fig. 1 is a perspective view showing the van or trailer with stalls erected at opposite sides thereof.

In the several drawings, parts are shown greatly exaggerated for clearness of illustration. The structure is actually light in weight and of relatively thin sections.

The invention may be applied to any suitable form of vehicle trailer that is adaptable for the purpose, but is shown as embodied in a vehicle trailer of the type customarily adapted to be drawn behind an automobile, as an example of the means for using the invention. The details of the trailer structure and its draft means are omitted, since these are well-known in the art and the invention may be applied to any suitable form thereof.

Moreover, this invention is an improvement on the form of my invention shown in my application filed August 29, 1947, Ser. No. 771,341, now Patent No. 2,621,070, granted December 9, 1952, to which reference may be had for a more complete illustration of some of the details of the invention.

In this embodiment of the invention, the trailer body is mounted on a chassis frame, generally indicated by the numeral 1, supported upon the usual wheels 2 with or without a spring mounting thereon. The chassis frame 1 has a coupling 3 at the front end thereof for attachment to a draft vehicle, such as an automobile body. A supporting wheel 4 is connected with the front end of the chassis frame 1 for holding the trailer level when it is in a stationary position.

The trailer is shown in the form of an enclosure with opposite side walls 5, and a roof 6, all suitably braced and supported by upright bars, as indicated at 7 and 8 in Fig. 6, and by cross bars 9 (see Fig. 10). A floor 10 closes the bottom of a compartment 11 provided between the respective side wall structures of the trailer, as will be apparent from Fig. 10.

A living compartment may be provided in the front end portion of the trailer, having provisions for the accommodation of an attendant, as a bed, table, cook stove, etc., as described more in detail in my prior application, Ser. No. 771,341. Access thereto may be had by means of a door 12 in a side wall 5 of the trailer, as shown in Fig. 1. A door may be provided between the living compartment and the van compartment 11 for passage of an attendant therebetween, when desired.

The trailer in transport position has the opposite sides thereof folded or stored, substantially as shown in Figs. 3 and 7, but these folded parts are adapted to be opened out to an extended position to form stalls or compartments at opposite sides of the trailer, as shown in Figs. 1 and 6. The stalls are identical with each other in the example illustrated and described, and only one of these need be described in detail since it will be apparent that they are the same in construction, and are similarly set up in use.

Each of the side walls 5 is cut away at 13 along a substantial portion of the length thereof, beneath the roof 6. At spaced points along the side 5 of the trailer, at opposite ends of the cut-out 13, are upright supports or journals, generally indicated at 14 and 15, that extend throughout the major portion of the height of each side of the van. These supports 14 and 15 are carried by the side wall 5.

Panels 16 and 17 are mounted on the journals or supports 14 and 15, respectively, by bushings 18 sleeved over the journals, whereby the panels 16 and 17 are capable of swinging movement from the position shown in Fig. 7 to the position shown in Fig. 6 with respect to the journals 14 and 15. At the same time the panels 16 and 17, which normally would be retained in elevated positions on the van by a bracket 19 during the transportation of the latter, as shown in Fig. 3, may be moved lengthwise of the journals 14 and 15 to a lowered position, as shown in Fig. 1, where the lower edge of each panel would bear directly against the ground when the panels are set up to form a side of the stall (Fig. 5).

The lower edge of each panel, preferably, is formed of a thin sheet, indicated at 20 in Fig. 5, capable of being forced into the ground along the edge of the panel to form a tight seal at the bottom along the ground level against the entrance of water or air into the stall.

Each of the panels 16 and 17, preferably, is formed of light-weight material, such as aluminum, having a sheet metal side structure mounted on a braced and reinforced frame capable of handling as a unit. Windows preferably are formed in the upper portion of each of the panels 16 and 17, as shown at 21 in Fig. 4, and it is preferred that windows be provided thus along the entire length of each side wall. Each window is covered by a shutter 22 hinged at the top edge thereof to the upper portion of the panel, with provision for closing and securing the shutters, as by braces 23, or other securing means.

Each panel 16 and 17 is shown as provided with a hand rail 24 thereon for manipulation of the panel, to move it either to closed or open position, and for lifting the panel from its lowered position to its elevated or transport position as shown in Fig. 3. Each panel is held in its elevated position by a hasp or other fastening, generally indicated at 25 in Fig. 3, as well as by the step bracket 19. An additional fastening is shown at 26 in Fig. 3, in the form of a bolt extending through aligned holes in the closed panels 16 and 17.

One of the panels should be provided with an access door into the stall formed thereby, such a door being shown in Fig. 1 and designated generally at 27. This door is also provided with a window 28 therein, although such a window may be omitted if not required.

The outer end of the stall is enclosed by an end panel 29, preferably made also of light-weight material, such as aluminum sheeting supported on a suitable frame 30. The end panel 29 is secured to the side panels 16 and 17 by headed bolts or fastenings 31 on the panel 29 engaging in keyhole slots in the frames of the panels 16 and 17. The panel 29 extends upwardly only partway of the height of the side panels.

The upper part of the panel 29 includes a section 32 hinged to the end panel 29 at 33 along the upper edge of said end panel, capable of folding downward of the upper section when desired, especially for admission of air into the stall, and for storage in the van. The section 32 is held in upright position by rods 34 extending through vertically aligned eyelets 35, 36, on the frames of the panels 16, 17, and the panel section 32.

The roof is designated generally at 37 and covers the entire stall enclosure in extended position, as shown in Fig. 1. This roof, preferably, is formed of canvas which is suitably reinforced or stiffened to maintain its shape. The roof has a series of windows 38 formed therein that are made of suitable material, such as "Celloglass," that will transmit the ultraviolet rays of sunlight through the roof to the interior of the stall for the beneficial effect thereof on the animals.

As shown in Fig. 5, the roof is formed in two sections, each of which is attached to the top edge of one of the side panels 16 and 17, as indicated at 39 in Fig. 5, and the roof sections are brought together in the middle and secured together by a weatherproof fastening. One of the roof sections 37 has a sheet metal channel 40 along the inner edge thereof, while the adjacent sheet metal edge of the other roof section 37, designated at 41, is adapted to be inserted into the channel 40. A strip of rubber weather-stripping 42 attached to the edge 41 enters the channel 40 and prevents leakage through the joint. (See Figs. 12 and 13.)

A bowed effect is obtained at opposite edges of the roof covering by connecting a row of coiled springs 43 from the upper edge of each wall panel 16 and 17 to an intermediate point of each roof section, and spaced along the length of the roof, with sufficient tension to hold the canvas stretched and bowed at the opposite edges of the roof, as shown in Fig. 5. These springs 43 also cause the roof sections 37 to fold downward on the side panels 16 and 17 upon separation of the joint 40—42. Moreover, they maintain sufficient tension on the joint to keep the roof bowed upward in the center, as shown in Fig. 5.

The roof sections 37 are also secured to the side of the van by canvas extensions 44 on the ends thereof and integral therewith, that extend inward into the cut-away 13, and are secured to the roof by a row of detachable fastenings 45 along the inner edge of each of the roof extensions 44. This forms a weather-proof connection between the van and the adjacent end of the stall structure, which prevents leakage therebetween and seals the roof of the stall structure effectively.

Upon disengagement of the detachable fastenings 45, and separation, each roof section 37 can be folded down on the inside of the stall panels 16 and 17, about the pivotal connections 39, and the side panels 16 and 17 then can be turned about the journals 14 and 15 to their collapsed positions shown in Fig. 7.

The outer ends of the roof sections 37 have flaps 46 that overlap the end wall hinged section 32 and prevent the entrance of rain or wind through that portion of the structure into the stall. The flaps 46 hang loose but are capable of being lifted to allow the downward folding of the wall section 32 when these parts are detachably connected together or separated from each other.

The inner end of the stall structure normally is closed by a panel 47 (see Fig. 5) which is inserted against a side of the van over the wheels and open space beneath the chassis frame 1. This panel 47 is secured to the side of the van by suitable fastenings at opposite ends thereof, so as to prevent the horse from reaching under the van or becoming entangled with the wheels, and thereby protecting both the animal and the van from injury or damage. The lower edge of the panel 47 may be inserted directly into the ground to render the stall weatherproof at that point.

The panel 47 is provided with a door 49 in a side thereof, slidably mounted in the panel so that, upon opening of the door 49, the stall may be cleaned out to any extent desired, especially during inclement weather. This door 49 serves also, when the panel 47 is in stored position in the van, to gain access to the hay rack.

Each side of the van is provided with facilities needed in care of the horse, including feed and water. A hay rack is shown at 50 open through bars at opposite sides of the wall structure of the van for access thereto by the animal, either in the stall or when confined in the van in the compartment 11. A storage hopper is shown at 51 for bran or other feed. A cabinet space is shown at 52 provided with shelves which may be closed by a door, as illustrated, and an additional cabinet is shown at 53 for holding tools. A separate feed receptacle 54 has a discharge spout in an open space 55 that has a trough at the bottom for discharge of feed into a bucket or receptacle or into the trough for feeding of the animal. A water connection is shown at 56 in the form of a flexible hose connected with a suitable valve and pipe which may be attached to a source of water supply under pressure, as a city water main.

Provision is also made, is desired, for heating water, for which purpose I have shown a hot water heater tank at 57 in an elevated position, that may have connections also with the source of water under pressure under the control of suitable valves and any suitable means for heating the water in the tank 57. The water from the tank 57 may be led down through a hose or other connection to the trough at the bottom of the open space 55, or be provided with a suitable outlet therefor. Hot water is needed only at infrequent intervals as, for instance, in grooming the horse in the morning. The heater may be used on such occasions with safety, since an attendant would be available and present at all times.

The van structure is shown in Figs. 1 and 6 with the stalls extended, but it is also possible to fold the stall structure to compact relation for transportation. The parts may be disassembled readily and quickly even by a single attendant in a very few minutes. It is necessary merely to disconnect canvas extensions 44 upon separation of the fastenings 45, and then disconnecting the roof sections 37, separating them at the joint 40—42, which will allow the roof sections 37 to be folded down on the inside of the stall panels 16, 17.

The end wall section 32 is folded by being turned downward upon the end panel 29 about the hinge 33. The section 32 is disconnected from the side panels 16, 17, by separation of the connecting rods 34 that are respectively withdrawn from the clips or fastenings interconnecting the walls. The panel 29 is separated from the side panels by disengaging the fastenings 31 from the interconnected slots.

These end walls then may be removed, and the respective sides are folded inward from the positions shown in Fig. 6 to the positions shown in Fig. 7, where they overlap each other against the sides of the van. This folding and overlapping will require a lifting of each of the side panels 16, 17, to the relative positions shown in Fig. 3, where these are retained by the step bracket 19, as well as the hasp 25 and fastening 26 that lock the wall panels in place during transportation.

The end wall panel 29 and section 32 are stored inside the van on the floor thereof. The end wall panel 29 is slidably mounted in a guide 58 provided on the floor 10 of the van at a side of the compartment 11 and is disposed in upstanding relation (Fig. 10) against the upright braces of the side of the van. A bracket 59 engages an edge of the panel 29 to hold said panel in upstanding relation, with the section 32 behind the panel 29.

The panel 47 is seated upon the panel 29, with its upper edge slidably fitting into a complementary guide 60 in the roof of the van, which members 29 and 47 thereby form a side closure wall for the compartment 11 in which the animal is housed during transportation. The panel 47 has a flanged lower edge that overlaps the upper edge of the panel 29 upon which the former is seated.

These sections 29 and 47 are locked together and in place by a guard rail 61 which extends from side to side of the compartment 11 at each of the forward and rearward end portions thereof, two guard rails thus being provided to confine the animals therebetween. Each guard rail 61 is shown in Figs. 8 and 9 as having a pin 62 slidably mounted in each opposite end thereof and normally urged relative thereto by a coiled spring 63 housed within the end portion of the guard rail 61. A locking pin 64 is secured to the projecting pin 62 and located within a bayonet slot 64′ capable of being turned at the end of the bayonet slot, whereby the projecting pin 62 may be withdrawn, or locked in its extended position.

The projecting pins 62 at the opposite ends of the guard rails 61 enter aligned openings formed in the walls or panel sections 29 and 47 in overlapping relation, and thereby lock the sections together, as well as to hold the guard rails in place, extending transversely of the compartment 11. Upon withdrawing of the projecting pins 62 from these openings, the guard rails may be removed for release of the horses, as well as for disassembly of the members 29 and 47.

The horses are separated from each other within the van by upright columns 68 detachably mounted in the floor and roof of the van at the forward and rear end portions of the compartment 11, and preferably interconnected at the lower end portions by a panel 65, as shown in Fig. 10. These parts may be disassembled also, if desired, when the horses are removed.

When the panel 47 is in place, as shown in Fig. 10, the door 49 provided therein may be opened to afford access by the animal to the feed rack 50. The latter is open to the interior of the compartment 11, as noted above, being provided with bars on both sides of the feed rack, as shown in Fig. 6, so as to provide feed during transportation, as well as when the animals are in the stalls.

Referring to Fig. 4, I have shown a tail gate 66 hinged to the back end portion of the van, capable of being lowered to the position shown in Fig. 4 for loading or unloading of the animal. When turned to its upright position, this tail gate 66 closes the back end of the compartment 11 to confine the animals therein during transportation. This tail gate is securely braced and provided with ribs to accommodate the walking thereover of the animals during loading or unloading.

Suitable provisions may be made in a customary manner for illuminating the interior of the van, as well as the stalls. Such illumination is well-known in the art and is not illustrated in detail, since any suitable form thereof may be used as desired.

While I have shown and described one embodiment of the invention, it is recognized that variations and changes may be made therein without departing from the invention as specified in the claims. The description of the invention as a horse van is intended merely as an example of the invention. This trailer may be used for many other purposes, such as living quarters, office and sales space etc. Floors may be provided in the respective stall spaces. Steps may be provided in place of the tail gate 66. Other changes in the construction may adapt it to other uses.

I claim:

1. A van of the character described, comprising a vehicle body having a compartment therein, guides extending lengthwise along the upper and lower edges of said compartment, a panel slidably mounted upon one of the guides, a second panel seated upon the first-mentioned panel at one edge separate therefrom and relatively movable and having its opposite edge slidably received in another of the guides, the last-mentioned panel having a lower edge portion overlapping the upper edge of the first-mentioned panel, and brace means inter-engaging said overlapped edges of the panels for holding the panels in place in the guides.

2. A van of the character described, comprising a vehicle body having a compartment therein, guides extending lengthwise along the upper and lower edges of said compartment, a panel slidably mounted upon one of the guides, a second panel seated upon the first-mentioned panel at one edge and having its opposite edge slidably received in another of the guides, the last-mentioned panel having a lower edge portion overlapping the upper edge of the first-mentioned panel, brace means engaging said overlapped edges of the panels for holding the panels in place in the guides, said panels having aligned openings in the overlapped edges thereof, and the brace means including a bar having a pin on the end thereof inserted in the aligned openings and holding the panels together.

3. A van of the character described, comprising a vehicle body, a plurality of panels at one side of the vehicle body and extending laterally therefrom in spaced side-by-side relation, upright hinge members connected with the body, means mounting the panels on the hinge members for outward swinging movement relative thereto and for upward and downward sliding movement with respect to the vehicle body, said upright hinge members extending downward along the body relative to said means for lowering movement of the panels substantially into engagement with the ground upon said outward swinging movement relative to the body, and a roof covering section connected with the upper edge of each panel and carried thereby, said roof sections extending inwardly in interconnected relation over the space between the side-by-side panels and detachable from each other for inward swinging movement with the panels against the side of the vehicle body.

4. A van of the character described, comprising a vehicle body, a plurality of panels at one side of the vehicle body and extending laterally therefrom in spaced side-by-side relation, upright hinge members connected with the body, means mounting the panels on the hinge members for outward swinging movement relative thereto and for upward and downward sliding movement with respect to the vehicle body, said upright hinge members extending downward along the body relative to said means for lowering movement of the panels substantially into engagement with the ground upon said outward swinging movement relative to the body, a roof covering section connected with the upper edge of the panel and carried thereby, said roof sections extending inwardly in interconnected relation over the space between the side-by-side panels and detachable from each other for inward swinging movement with the panels against the side of the vehicle body, and means on the vehicle body in position for supporting the panels in elevated positions with respect thereto upon inward swinging movement thereof.

5. A van of the character described, comprising a vehicle body, a plurality of panels at one side of the vehicle body and extending laterally therefrom in spaced side-by-side relation, upright hinge rods connected with the body at longitudinally spaced points, bushings mounting each panel at vertically spaced points on one of the hinge rods for outward swinging movement relative to the body and for upward and downward sliding movement with respect to the vehicle body, said upright hinge rods extending downward along the body substantially throughout the height of the panels for lowering movement of the panels substantially into engagement with the ground upon said outward swinging movement relative to the body, said panels being collapsible against the vehicle body by swinging movement on said hinge rods, and a bracket on the vehicle body in position to engage and support the lower edge portions of the panels when folded inward on the hinge rods, the sliding movement of the panels along the hinge rods being greater than the distance between the bracket and the ground.

References Cited in the file of this patent

UNITED STATES PATENTS

| 730,275 | Laswell | June 6, 1903 |
| 1,133,693 | Allen | Mar. 30, 1915 |
| 1,371,950 | Tracy | Mar. 15, 1921 |
| 1,861,548 | Peck | June 7, 1932 |
| 2,038,001 | Redding | Apr. 21, 1936 |
| 2,104,430 | MacEvoy | Jan. 4, 1938 |
| 2,122,681 | Dykes | July 5, 1938 |
| 2,129,438 | Nitsche | Sept. 6, 1938 |
| 2,484,312 | Rebours | Oct. 11, 1949 |

FOREIGN PATENTS

| 299,179 | Great Britain | Oct. 25, 1928 |
| 338,311 | Great Britain | Nov. 20, 1930 |
| 471,778 | Great Britain | Sept. 10, 1937 |
| 523,333 | Great Britain | July 11, 1940 |